ment

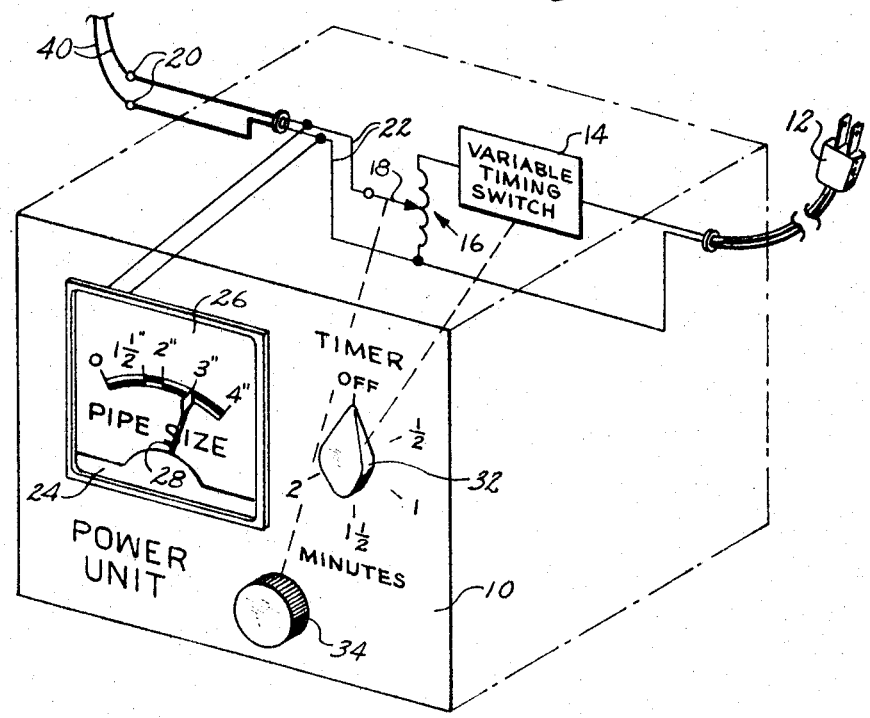
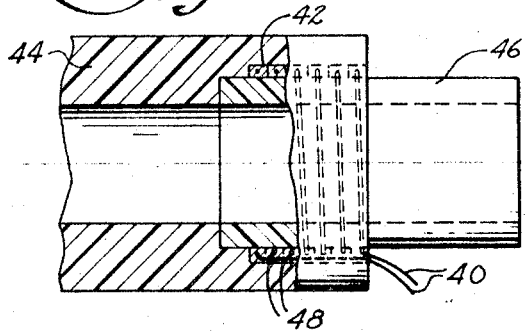

United States Patent Office 3,465,126
Patented Sept. 2, 1969

3,465,126
POWER UNIT
James J. Blumenkranz, Hollywood, Calif., assignor to Susquehanna Corporation, a corporation of Delaware
Filed Oct. 25, 1967, Ser. No. 678,052
Int. Cl. H05b *3/02*
U.S. Cl. 219—482                           4 Claims

ABSTRACT OF THE DISCLOSURE

An example of the power unit is a power supply which uses a variable auto-transformer for voltage control. The controlled output voltage is supplied to plastic pipe joints for thermal welding. A voltmeter is connected across the output line and is responsive to the varying of the auto-transformer so that the user will know when the correct output voltage level has been attained for the size of plastic pipe being welded. The face of the meter is graduated in pipe-size indicia rather than in volts to permit this determination without the necessity for computations.

---

The present invention relates to a variable power supply for controlling the mount of power used in the thermal welding of plastic pipe joints.

Thermoplastic polymer have become increasingly important as materials for constructing many types of articles, primary examples of which are pipes and pipe fittings. The ability to withstand corrosion, the ease of handling, the minimum weight and the moldability of such materials make them extremely attractive for such use. Joining articles of thermoplastic polymers has been accomplished by conventional mechanical means such as threaded joints and flange connections, by chemical means such as solvent welding, and by thermal means such as flame or electrical resistance welding. In many applications mechanical joints are unacceptable due to their tendency not to be fluid-tight and because such assembly is time-consuming, expensive and cumbersome. Solvent welding requires some degree of care in applying the solvent to the surface of the articles to be joined and also requires immediate assembly of these articles since the solvent attacks the thermoplastic material immediately. Furthermore, some thermoplastic materials, for example, polypropylene, have relatively low solubility in conventional solvents used for welding and, therefore, to date, have been joined primarily by mechanical joining means or by thermal welding.

One of the methods used for the thermal welding of plastic pipes and fittings involves the use of a welding sleeve of the type described in U.S. Patent No. 3,094,452, which includes an electrical resistance element. The sleeve is located in an annulus defined by the pipe fitting and the pipe which lies within the pipe fitting. Electric current is caused to pass through the sleeve, either inductively or conductively, and the resultant heat effects fusing of the thermoplastic sleeve, fitting and pipe.

To date, the plumber or pipe fitter who must make the pipe joints while on the job has not been provided with a power supply which can automatically provide the correct electric current needed to melt the sleeve and fuse the sleeve, fitting, and pipe into an acceptable joint. He is now expected to first compute the power needed to make an acceptable joint, and then to adjust a power supply so that the correct current is applied to the resistance element for the correct time interval. These computations are usually made on the job just before the making of the joint, and the time expended in this effort results in increased plumbing costs. Furthermore, these computations are open to error, and even if correct, other errors can occur in the setting of a voltage or current level or in timing the welding step. The result of error causes either an inadequately fused joint or an excessive flow of the plastic in the pipe, fitting, and resistance element. The resultant joint in either case is below standard and therefore unacceptable.

Summary

Briefly, the present invention includes a power unit which is used in the thermal welding of plastic pipe joints. The unit has an input for receiving an external voltage supply and an output which supplies a controlled voltage to the resistance wire of a welding sleeve. A meter which is connected across the output has a face graduated in pipe-size indicia. Voltage control means are provided for controlling the output voltage, together with means for varying the voltage control means, to set the output voltage at a predetermined level. The predetermined level is attained upon alignment of the meter needle with the pipe-size graduation corresponding to the size of pipe in the joint which is to be welded.

It is an object of the present invention to provide an improved power unit which facilitates the rapid selection of the electrical power needed to thermally weld plastic pipes and fittings, thereby eliminating the time and expense normally involved in computing power.

Another object of the present invention is to provide an improved electrical power unit which can be used to weld plastic pipe joints such that acceptable pipe joints are repeatedly produced.

A further object of the present invention is to provide an improved power unit, for use in welding plastic pipe joints, whose output can be varied to accommodate readily a variety of pipe sizes without the necessity for computing voltage levels, welding time and the like.

Still another object of the present invention is to provide an improved power unit for welding plastic pipe joints in which the power needed to effectively weld a variety of pipe sizes is readily selected, thereby reducing the chance of error occurring in the welding process and a resultant sub-standard joint.

Other objects and advantages will become apparent from a reading of the following specification in conjunction with the accompanying drawing.

Brief description of the drawing

FIGURE 1 is a view of the front panel of the power unit in combination with an electrical schematic of the power unit; and FIGURE 2 is a partially cut-away view of a plastic pipe joint prior to welding.

Description of the preferred embodiment

In FIGURE 1 there is shown a power unit which is used to supply power to a thermoplastic welding sleeve as later described. As shown, the front panel 10 of the power unit is displayed with mechanical and electrical connections to an electrical circuit which is positioned on the inside of the power unit, and which is shown here in schematic form. External voltage is applied through a conventional plug 12 to a variable timing switch 14, which also serves as an on-off switch. Connected to timing switch 14 is a variable transformer 16, here shown as an auto-transformer. The voltage selected by tap 18 of the transformer 16 is supplied to the output terminals 20 by lines 22, which extend outwardly from the power unit.

Connected across lines 22 is a voltmeter 24 which is mounted on front panel 10. Meter 24 is conventional in construction except for the face 26. Instead of the normal voltmeter indicia, this face 26 contains the words "Pipe Size" and is graduated with indicia corresponding to preselected pipe sizes. As shown in FIGURE 1, these pipe sizes are one and one-half inches, two inches, three inches, and four inches. The meter needle 28 deflects in response to the voltage applied to the meter. The indicia together with needle 28 permit the user of the power unit to ascertain when the desired pipe size has been selected.

Variable timing switch 14 is mechanically connected to the dial 32, rotatively mounted on the panel 10. This switch, which is conventional, is actuated by the rotation of dial 32 to the desired timing period, set out in minutes on the panel 10. Knob 34 is mechanically connected to contact 18 of transformer 16 to vary the voltage applied to the output terminals 18. This varying of voltage also changes the setting of the needle 28 in meter 24. Thus, through the rotation of knob 34 the desired pipe size can be selected by the alignment of the needle 28 with the graduation corresponding to the size of the pipe in the joint to be welded. The terminals 20 are preferably formed with some sort of conventional securing means such as binding posts (not shown) which are operable to permit the attachment of the two ends 40 of a resistance wire.

FIGURE 2 is a partially cut-away showing of a pipe joint before thermal welding has occurred. Welding sleeve 42 reposes in a counterbore formed in pipe fitting 44. A tight fit exists between the sleeve 42, fitting 44, and a pipe 46 which is inserted into fitting 44 such that the sleeve 42 lies between and abuts both of these members. The welding sleeve 42 contains an imbedded electrical resistance element 48 arranged as a coil, the two ends 40 of which are brought out of the joint to provide a means for energization of the resistance element and thus welding of the joint. If further understanding of the construction of the welding sleeve 42, pipe fitting 44, and pipe 46 is desired, attention is invited to the aforementioned U.S. Patent No. 3,094,452, or to U.S. patent application Ser. No. 536,057, filed Mar. 21, 1966.

Operation

Both FIGURES 1 and 2 will now be utilized in a description of the operation of the invention. The joint as shown in FIGURE 2 is first assembled, but the ends 40 of the resistance sleeve 42 are not connected to the terminals 20 of the power unit. Plug 12 is inserted into an appropriate receptacle and then switch 14 is closed to apply A.C. power to the circuit. This switch closing is accomplished by rotation of dial 32 away from the OFF position. Transformer tap 18 is adjusted by knob 34 so that the meter needle 28 points to the pipe size corresponding to the external diameter of the pipe 46 which is to be joined with the fitting, e.g., three inches.

With the meter 24 now set to the correct pipe size, switch 14 is opened by rotation of dial 32 back to the OFF position. The two wire ends 40 are now attached to the terminal 18. Switch 12 is again closed through rotation of dial 32 away from the OFF position, but this time the dial is turned to a specific timing position, such as the one and one-half minute timing position. Current flows into the resistance element 48 of sleeve 42 for the duration of this timing period. At the end of the one and one-half minute period, the dial 32 will have returned to the OFF position and switch 14 opens. No further current is applied to the sleeve. For the timing period selected, the heat generated by the flow of current through the resistance element 48 is sufficient to fuse completely the sleeve, fitting and pipe into a unitary joint. Upon cooling, the joint becomes rigid.

When the timing switch 14 opens at the end of the timing period, the wire ends 40 can be disconnected from the output terminals 20 and the power unit becomes available for use in fusing other joints. Each time the unit is used, the switch 14 is first closed and dial 34, and accordingly tap 18, is adjusted so that the needle 28 of meter 24 becomes aligned with the pipe-size number corresponding to the external diameter of the pipe to be welded.

The key feature of the present invention is the graduation of the face 26 of the meter 24 in pipe-size indicia. This concept affords to the user of the power unit, such as a plumber, a convenient and accurate means for selecting the correct voltage to be applied in thermal welding so that acceptable joints can be repeatedly produced. The necessity for computing the amount of power or voltage required to fuse each one of a variety of joints is eliminated, as is the additional step of adjusting a power supply to the computed level.

For each pipe size selected at the face 26 of the meter 24, a predetermined level of output voltage is selected for application to a welding sleeve. In the predetermination of voltage levels—a procedure performed when the power unit is assembled—the resistance of the wire in each sleeve is significant. Resistance increases with sleeve diameter because more resistance wire is used in forming the sleeve. In the welding procedure, it is preferred that the same current level be maintained for every sleeve regardless of size. Therefore, as the diameter and thereby the resistance of the sleeve increases, the voltage must be increased to bring the current up to the proper level. This current, as it flows through the resistance element is designed to deliver sufficient power during the selected one and one-half minute period to fuse completely the joint but not to cause excessive flow of plastic. The result is a sound and acceptable joint in every instance.

Once the voltage level for every sleeve has been determined, the face of the meter is graduated in pipe-size indicia with each pipe size graduation positioned at the corresponding, predetermined voltage level. Pipe size is chosen rather than sleeve size for the meter face because pipe size is the standard reference generally used in the plumbing trade; but the diameters of a pipe and its associated sleeve are recognized as being essentially the same, and if desired, the meter face could be labeled in terms of sleeve size. If it is found that the indicia on the meter face are too compressed, a step-down transformer can be inserted in line 22 before the junctions of meter 24 so that the scale of the meter is expanded and the spacing of the indicia correspondingly increased. This step-down transformer would also isolate the input from the output and eliminate high-voltage shock hazards.

While a preferred embodiment of this invention has been shown and described above, it will be obvious to those skilled in the art that various changes and modifications may be made without departing from the invention in its broader aspect. Therefore, it is intended in the appended claims to cover all such changes and modifications as fall within the true spirit and scope of this invention.

What is claimed is:

1. A power unit for use in the thermal welding of plastic pipe joints, said joints including a variety of pipe sizes, comprising:

an input and output, said input being designed to receive an external voltage supply and said output being designed to supply a controlled output voltage to a resistance wire used in said thermal welding, voltage control means connected between said input and output, a meter connected to said output, said meter including needle and a face, said face having graduations of pipe-size indicia, means for aligning said needle with the pipe-size graduation which will correspond to the size of pipe in the joint to be welded, said alignment means being connected to said voltage control means to set the voltage supplied to said output at a predetermined level, said predetermined level being reached upon alignment of said needle with the pipe-size graduation corresponding to the size of pipe in the joint to be welded.

2. A power unit as claimed in claim 1 wherein said voltage control means is an auto-transformer having a variable tap, and said aligning means includes manual adjusting means mechanically connected to said tap for varying the position of said tap and thereby the output voltage.

3. A power unit as claimed in claim 2 further comprising:
   a timing switch connected in circuit with said autotransformer,
   manual means for setting the timing switch to a desired timing period, thereby permitting the application of output voltage for the duration of said timing period.

4. A power unit as claimed in claim 3 further comprising:
   a front panel for said power unit,
   said meter, manual means, and manual adjusting means being accessibly mounted on said front panel.

References Cited
UNITED STATES PATENTS

| | | | |
|---|---|---|---|
| 2,790,059 | 4/1957 | Burnett | 219—240 |
| 2,955,186 | 10/1960 | Ritter | 219—448 |
| 3,038,984 | 6/1962 | Snyder | 219—487 |
| 3,060,299 | 10/1962 | Morgan | 219—503 |

BERNARD A. GILHEANY, Primary Examiner

F. E. BELL, Assistant Examiner